United States Patent [19]

Peleg

[11] Patent Number: 5,260,070
[45] Date of Patent: * Nov. 9, 1993

[54] MICROWAVE RECONSTITUTION OF FROZEN PIZZA

[75] Inventor: Yigal Peleg, Solon, Ohio

[73] Assignee: The Stouffer Corporation, Solon, Ohio

[*] Notice: The portion of the term of this patent subsequent to Jun. 2, 2009 has been disclaimed.

[21] Appl. No.: 944,326

[22] Filed: Sep. 14, 1992

Related U.S. Application Data

[63] Continuation of Ser. No. 813,064, Dec. 23, 1991, abandoned, which is a continuation of Ser. No. 666,943, Mar. 11, 1991, abandoned.

[51] Int. Cl.$^5$ .................... A21D 15/08; A21D 6/00
[52] U.S. Cl. ........................... 426/94; 426/243; 426/249; 426/250; 426/262; 426/270; 426/309; 426/549; 426/613
[58] Field of Search ............ 426/94, 250, 270, 309, 426/243, 262, 540, 613, 249

[56] References Cited

U.S. PATENT DOCUMENTS

| | | | |
|---|---|---|---|
| 4,230,924 | 10/1980 | Brastad et al. | 426/234 |
| 4,267,420 | 5/1981 | Brastad | 426/107 |
| 4,448,791 | 5/1984 | Fulde et al. | 426/243 |
| 4,594,492 | 6/1986 | Maroszek | 426/113 |
| 4,626,641 | 12/1986 | Brown | 426/107 |
| 4,641,005 | 2/1987 | Seiferth | 426/107 |
| 4,656,325 | 4/1987 | Keefer | 426/107 |
| 4,891,482 | 1/1990 | Jaeger et al. | 426/107 |
| 5,118,514 | 6/1992 | Adams et al. | 426/94 |

FOREIGN PATENT DOCUMENTS 275271 5/1964 U.S.S.R. .................... 426/250

OTHER PUBLICATIONS

Farmer, Fannie, 12th Ed. The Fannie Farmer Cookbook, 1979, Bantam Books, N.Y., N.Y. p. 729.

Primary Examiner—Helen F. Pratt
Attorney, Agent, or Firm—Body, Vickers & Daniels

[57] ABSTRACT

A method of making a microwave reconstitutionable pizza including coating the outer peripheral edge of the pizza crust with a liquid crust coloring substance, which includes an aqueous solution of an edible dispersion agent and a natural occurring coloring agent which can be coffee, tea, chicory and mixtures thereof.

16 Claims, 3 Drawing Sheets

MICROWAVE RECONSTITUTION OF FROZEN PIZZA

This is a continuation of Ser. No. 813,064 filed Dec. 23, 1991, now abandoned, which is a continuation of Ser. No. 666,934, filed Mar. 11, 1991, now abandoned.

This invention relates to the art of reconstituting a frozen food entree having a crust, such as a frozen pizza by using microwave energy and more particularly to microwave reconstitution of frozen pizza so that the pizza has a browned crust in the areas not directly contacted by a hot susceptor sheet used in the normal microwave reconstitution of frozen pizza.

INCORPORATION BY REFERENCE

For the purpose of background information, the following United States patents are incorporated by reference herein: Brastad U.S. Pat. Nos. 4,230,924; 4,267,420; Maroszek U.S. Pat. No. 4,594,492; Brown U.S. Pat. No. 4,626,641; Seiferth U.S. Pat. No. 4,641,005; and, Keefer U.S. Pat. No. 4,656,325. These patents relate to prior art concepts for incorporating special sheet material with a foodstuff cooked in a microwave oven to assist in the cooking of refrigerated and/or frozen foodstuffs. These patents constitute a portion of the patented prior art for background of the present invention so that details known in the art need not be repeated to understand the present invention and its novelty. Also incorporated by reference herein is Jaeger U.S. Pat. No. 4,891,482 disclosing a heating sleeve formed from microwave susceptor material for reconstituting elongated sections of pizza incorporating a French bread type crust portion. This prior patent discloses the use of a susceptor sheet for reconstituting frozen pizza wherein the susceptor sheet is wrapped completely around the pizza in the form of a self-standing tubular receptacle or sleeve. This particular receptacle is inappropriate for the common round pizza which has heretofore been heated on a pedestal of microwave susceptor material.

BACKGROUND OF INVENTION

The present invention is directed to a novel method of making a small, round frozen pizza to be reconstituted by microwave heating, the resulting microwave reconstitutionable pizza and the method of reconstitution of the frozen pizza. Frozen pizza is normally sold in a circular shape from the frozen section of a retail grocery outlet. This type of pizza product includes a lower crust portion with a generally flat bottom surface and an upper generally flat surface parallel to the bottom surface with a generally curved marginal portion between the parallel surfaces and extending around the periphery of the pizza. This marginal portion joins the two parallel surfaces forming the crust section upon which the normal sauces and other topping items are deposited to form the final pizza. After the pizza has been produced and frozen, it is distributed for such retail distribution. The pizza is to be reconstituted by subsequently thawing and baking. The present invention is directed to this type of mass produced, normally small, consumer pizza which is to be subsequently reconstituted by the customer.

The invention is particularly applicable for use in reconstituting frozen pizzas and it will be described with particular reference thereto; however, it may be used for reconstituting other frozen products formed from a crust material wherein a portion of the crust can not be contacted by a lower supporting surface of microwave susceptor material for the purpose of browning the crust area spaced from the hot susceptor material.

When manufacturing a frozen pizza, a lower farinaceous crust layer in the form of a circular, flat portion is used to support upper topping material formed from a combination of various substances including cheese, tomato sauce, meat and other food items. The topping material is added in an uncooked, often frozen condition onto the upper surface of the crust material in the manufacture of the pizza. The crust sometimes is partially baked for subsequent final baking by the customer. One of the basic requirements of a frozen pizza which is to be reconstituted by a customer is that the crust portion of the pizza has a taste and texture which is the same as convection oven baked pizza. In the past, such condition was generally obtained by thawing the pizza and then baking the pizza in a convection oven to accomplish the desired reconstituted appearance, texture and condition. Due to the starch and other characteristics of the lower crust layer of the pizza, it has been found that high quality reconstitution can be accomplished only by heating in a convection oven or at least combining thawing in a microwave oven and then final baking and browning in a convection oven. Attempts to reconstitute pizza by only microwave heating, a concept now popular with and demanded by the public, have not been commercially satisfactory primarily because the microwave reconstitution of pizza involves placing the lower surface of the pizza on a platform or pedestal formed from a microwave susceptor material. This material, as is well known, is heated by microwave energy to a substantially elevated temperature approaching 300°–400° F. Consequently, the lower surface of the pizza in direct contact with the hot susceptor sheet is browned and made crisp by the high temperature heat conduction directly from the lower microwave susceptor material. The rest of the pizza is adequately heated by microwave energy; however, those portions of the crust which are not covered by topping material and are visually exposed to the customer do not become browned. The crust has a pale appearance. Although the microwave heating procedure wherein the pizza is placed upon a susceptor pedestal causes heating of the crust to a temperature sufficient for baking the crust, the temperature is not sufficient for browning the crust except at the lower surface, which is in direct heat contact with the upper hot surface of the microwave susceptor pedestal. Consequently, attempts to bake, cook or otherwise reconstitute frozen pizza in a microwave oven has not been commercially acceptable except when employing the invention described in Jaeger U.S. Pat. No. 4,891,482, which invention can be used only for pizza using a French bread crust. The use of a susceptor sheet around the total pizza is costly. Consequently, there is a definite need for a procedure that renders microwave reconstituted pizza which is heated on a pedestal of microwave susceptor material and is still acceptable to the consumer.

THE INVENTION

The present invention relates to a method of making a microwave reconstitutionable pizza which overcomes the disadvantages of prior pizzas which necessitated a combination of microwave thawing and convection oven final baking of circular, frozen pizza mass produced for retail outlets.

In accordance with the present invention there is provided a method of making a microwave reconstitutionable pizza having a preselected outer periphery, a lower crust with a generally flat bottom surface, an upper generally flat surface parallel to the lower surface and a generally curved marginal portion around the periphery of the pizza and joining the parallel surfaces of the crust. The method of the present invention comprises the steps of depositing food topping onto the upper surface in a selected area having an outermost border generally matching the periphery of the pizza and exposing an outer band of visually exposed crust above the bottom surface of the pizza and coating the outer crust band with a liquid crust coloring substance. This substance may change in color or tint as it is heated during partial cooking of the pizza. This substance can be referred to as a microwave browning substance since it causes an appearance of normally a browned crust. The substance may be added to the pizza crust and then partially cooked or baked. This would produce the desired brown tint to the exposed crust. Preferably the color of the substance gives the tint without baking.

In accordance with a more limited aspect of the present invention as defined above, the method of forming the microwave reconstitutionable pizza involves forming the crust coloring substance as an aqueous solution of an edible dispersing agent and a natural occurring color agent selected from the class consisting of coffee, tea, chicory and mixtures thereof.

By coating the exposed crust portion above the lower flat crust surface of the pizza with the coloring substance and then heating the crust, this visually exposed portion of the crust has a brown color generally indistinguishable from a naturally browned crust of a pizza. Indeed, when the pizza is reconstituted by placing it upon a microwave susceptor sheet, the microwave energy cooks the pizza to the desired condition, while the hot flat microwave susceptor sheet browns the lower portion of the pizza crust. The liquid crust coloring substance covers the visually exposed crust band around the pizza so that it is visually acceptable to a customer. It has been found by using this invention, a round frozen pizza can be completely reconstituted by microwave energy in a microwave oven without baking the pizza in a standard convection oven, while still obtaining the desired visual and textural qualities desired by discriminating customers.

In accordance with a more limited aspect of the present invention, the edible dispersing agent is selected from the class consisting of liquid margarine, milk, milk powder, egg whites, egg white powder. Further, the liquid crust coloring substance, or browning agent, is sprayed onto the exposed portion of the crust during manufacturing of the pizza and before the pizza is cooked and frozen. Thus, when the pizza is sold in a retail outlet, it is removed from the package, placed upon a specifically constructed paper board pedestal structure having an upper microwave susceptor layer and located in a microwave oven. The microwave oven is energized to heat the pizza by microwave energy. The susceptor sheet becomes extremely hot. This hot susceptor sheet engages the flat undersurface of the crust portion of the pizza and browns the crust in accordance with standard practice. The liquid coloring substance tints the exposed portion of the crust a brown color mimicking an oven browned crust of a pizza. The coloring substance can be referred to as a "browning agent" because it produces an oven brown color for the exposed portion of the crust of the pizza. The tint is controlled by the amount of coloring agent in the coloring substance and, to a lesser extent, the baking temperature. Indeed, during the microwave heating the color may become slightly darker then the prebaked tint; however, this is not necessary since the amount of coffee, tea and/or chicory is selected to produce the desired brown tint matching the color of convection baked pizza crust.

In accordance with yet another aspect of the invention, the liquid crust coloring substance includes an aqueous solution of liquid margarine and either instant tea or instant coffee with the instant tea or coffee being about 3-10% by weight of the solution. In this manner, the water evaporates either during a heating process in the manufacture of the pizza or during the microwave heating of the pizza during reconstitution of the product.

In accordance with another aspect of the present invention there is provided a microwave reconstitutionable pizza having the characteristics obtained by the above explained method. Further, the invention involves a method of reconstituting a microwave reconstitutionable frozen pizza having the visually exposed portion of the crust coated with the above defined liquid crust coloring substance.

It is known to use a caramel substance on the skin of chicken and other poultry items for the purpose of causing the skin to have a brown appearance after microwave heating of the coated chicken, turkey or other poultry item. There has been no use of this type browning agent to solve the problem confounding for years the frozen pizza producers. This problem is the fact that microwave reconstituted pizza using a susceptor sheet for browning the undersurface of the pizza produces a pale exposed crust portion around the pizza, that is not conducive to acceptance by discriminating customers. For that reason, round frozen pizzas have normally been thawed in the microwave oven and then baked in a convection oven to brown the crust. This particular problem was overcome for a pizza on a French bread by using a susceptor sleeve; however, a sleeve is not economical or practical for a round pizza. As is known, by increasing the price of the susceptor sheet by only a few cents per carton, the profitability of a frozen, mass produced product can be drastically altered. The present invention overcomes the problem of producing a microwave reconstitutionable pizza heatable on a susceptor platform or pedestal and still obtaining the desired brown crust demanded by the public.

The primary object of the present invention is the provision of a method of making a microwave reconstitutionable pizza which can be reconstituted solely by microwave heating, while the pizza is placed upon a microwave susceptor sheet which browns the lower surface of the pizza, which method involves providing a coating on the visually exposed crust portion of the pizza so that the pizza appears to have an oven browned crust surface.

Yet another object of the present invention is the provision of a method, as defined above, which method involves the use of a liquid crust coloring substance formed from a natural occurring agent selected from the class consisting of coffee, tea, chicory and mixtures thereof.

The present invention has been practiced by applicant with other browning agents not developed by applicant; therefore, another object of the present invention is the provision of the specific crust coloring substance which can be used for coloring crust that is not directly contacted by a microwave susceptor material during the microwave reconstitution of the crust portion of a food product, such as pot pies and/or pizzas.

Still a further object of the present invention is the provision of a microwave reconstitutionable pizza having an outer band portion of the crust coated by a substance which colors the exposed crust portion to a color simulating an oven baked crust.

These and other objects and advantages will become apparent from the following description taken together with the accompanying drawings.

PREFERRED EMBODIMENT

Figure 1:
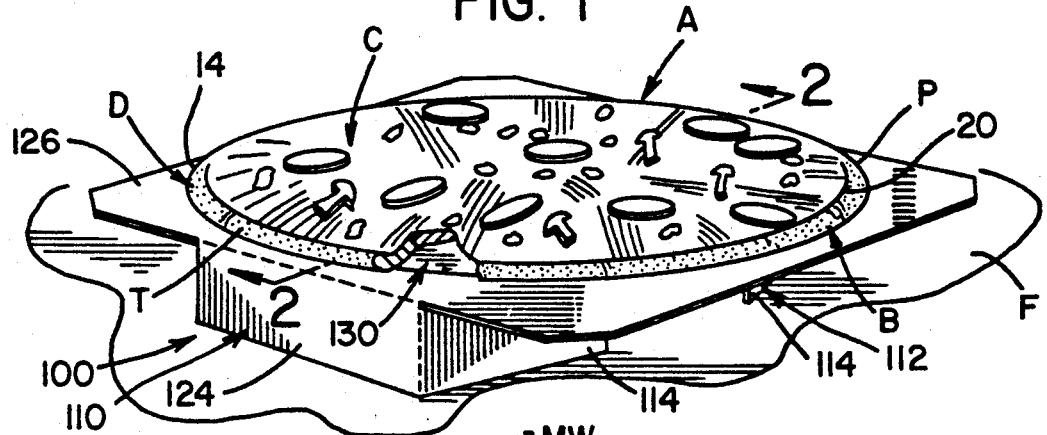
FIG. 1 is a pictorial view of a pizza produced by the present invention resting upon a paper board pedestal having an upper surface formed by microwave susceptor material, which upper surface contacts the lower flat surface of the pizza crust.

Referring now to the drawings, wherein the showings are for the purpose of illustrating a preferred embodiment of the invention only and not for the purpose of limiting same, FIGS. 1-6 illustrate a pizza A manufactured in accordance with the present invention. This pizza is preferably circular in shape and has an outer circular periphery P around the pizza. Of course, the pizza could have various shapes. In mass production of frozen pizza to which the present invention is directed, the circular shape is preferred. The diameter a of pizza A is approximately 8.0 inches and is sold in an individual box on which is printed the desired baking procedures for reconstitution of the frozen pizza into a hot pizza ready for service and consumption. Pizza A, except for the addition of the present invention, is somewhat standard and includes a lower crust portion B which is a kneaded and rolled dough section formed into a shape having a generally flat bottom surface 10 and a parallel generally flat upper surface 12, best shown in FIG. 7A. A curved marginal portion 14 extends around the periphery P and between parallel surfaces 10, 12 to complete the outer visually exposed surface of dough portion B of pizza A. In accordance with standard practice, crust portion B is covered with a topping C including sauces, cheese and a variety of pizza forming constituents deposited onto upper surface 12 in an area with an outer border 20 generally matching the circular periphery P, but spaced inward thereof to define the outer visually exposed crust band D. This exposed crust is between the parallel surfaces and can be defined by the included angle b as shown in FIGS. 7A-7D. Consequently, band D is the exposed crust area above bottom surface 10 and including border 20. This visually exposed area of crust portion B is treated in accordance with the present invention to produce novel pizza as shown in FIG. 8 and in FIGS. 1 and 2.

Figure 3:
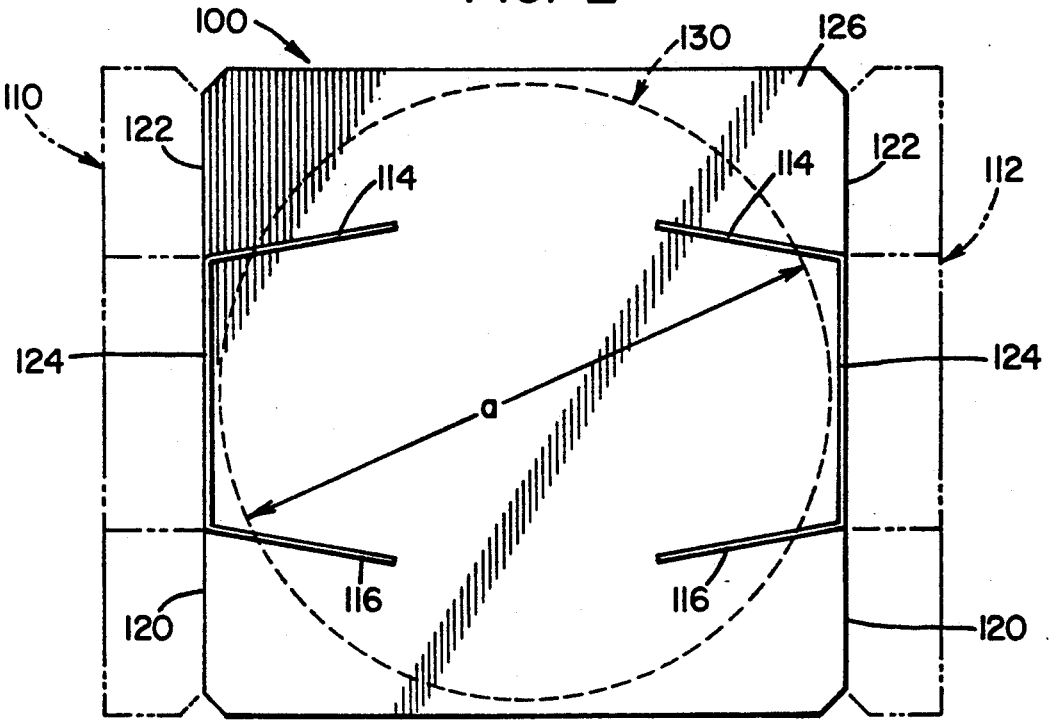
FIG. 3 is a bottom view of the embodiment shown in FIG. 1, with certain portions of the pedestal shown in phantom lines in their unfolded positions.
Figure 4:
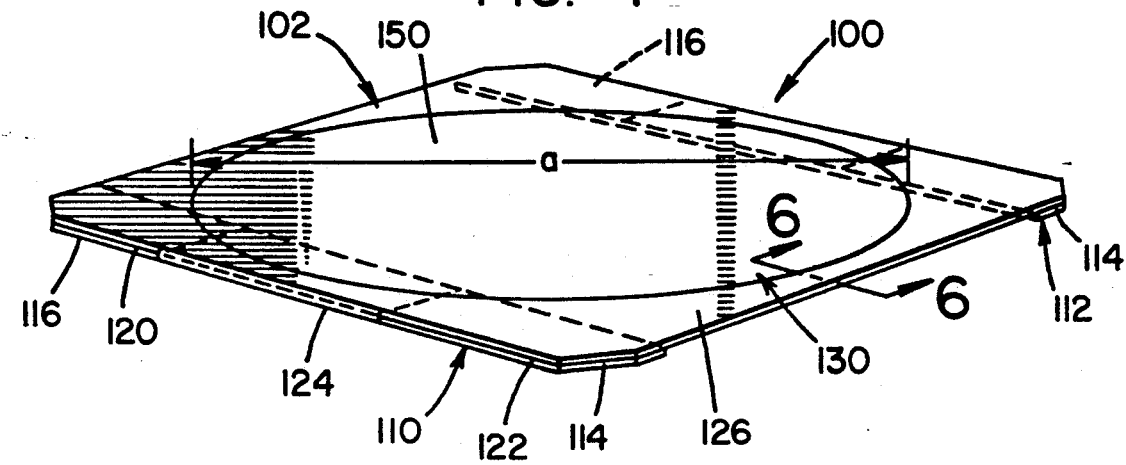
FIG. 4 is a pictorial view of the pedestal as it is placed in a frozen pizza package before it has been formed into a heating pedestal.

To heat pizza A manufactured in accordance with the present invention, there is provided a platform 100 formed from rigid paper board and packaged with pizza A in an initially flat, folded blank 102, best shown in FIG. 4. Platform or pedestal 100 is used to support pizza A above floor F of a microwave heating oven a preselected distance x, which, in practice, is approximately 1¼ inches. This lower spacing allows the microwave energy, indicated as arrows MW, to pass through the pizza and be reflected from floor F. In addition, microwave energy from the side of platform 100 can engage floor F and pass upwardly through platform 100 and then into the crust portion B of pizza A. The platform is spaced above floor F of a microwave oven so that the susceptor sheet at the upper surface 126 can be directly penetrated by microwave energy. This penetration causes heating of the susceptor sheet in accordance with standard practice. Platform 100 could have various forms; however, in practice, it includes inwardly folded flaps 110, 112 with outwardly extending, separate tabs 114, 116 defined by cuts 120, 122 defining integral support legs 124. As shown in FIGS. 3 and 4, the flat folded blank 102 is the initial form of platform 100. In this knocked down, flat condition, the platform can be shipped in the carton with the microwaveable pizza A without consuming valuable carton or package space. Thus, pizza A is shipped in a frozen condition with a blank 102.

Figure 2:
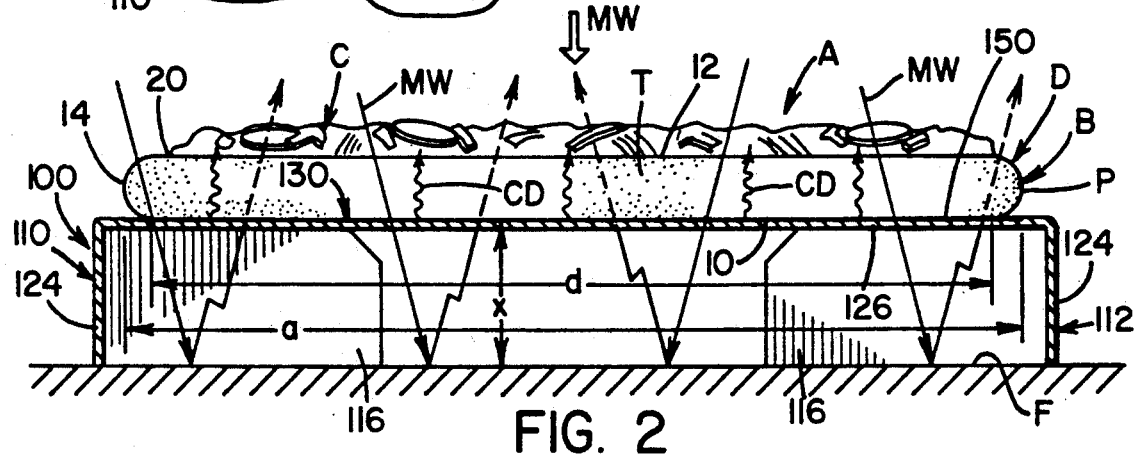
FIG. 2 is an enlarged cross-sectional view, taken generally along line 2—2 of FIG. 1.
Figure 5:
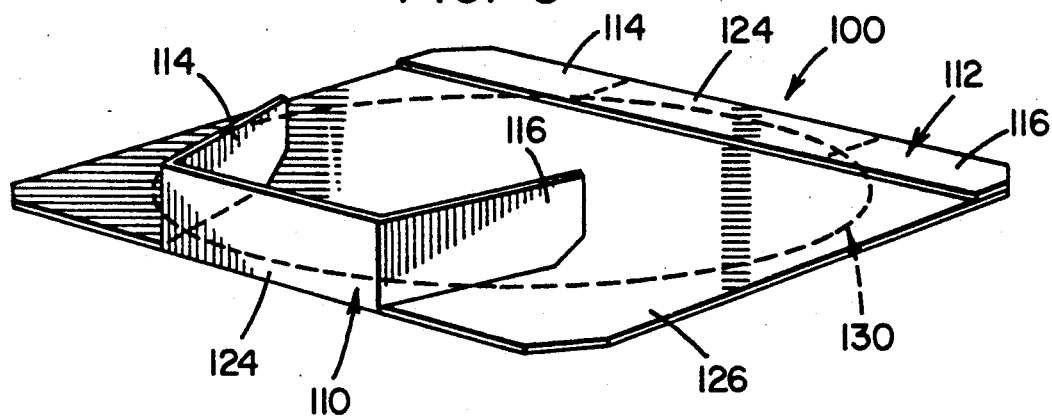
FIG. 5 is a view similar to FIG. 4 showing an initial pedestal assembly step.

When a customer purchases a carton containing pizza A and folded blank 102, the frozen pizza is removed from the carton and platform 100 is formed, as shown in FIGS. 1 and 2. Flaps 110, 112 are folded outwardly to be orthogonal with top sheet 126. Then tabs 114, 116 of flaps 110, 112 are folded inwardly as shown in FIG. 5. This rigidifies integral legs 124 and provides support for upper, or top sheet, 126 upon which pizza A is placed as shown in FIG. 2. The frozen pizza A is now in position within the microwave oven for complete reconstitution by microwave energy. There is no need for microwave thawing and then final baking in a standard convection oven when using the present invention. Pizza A, made in accordance with the present invention, produces a completely microwaveable frozen pizza that can be directly placed in a microwave oven and reconstituted directly from its frozen condition. This is a drastic and substantial improvement in the art of marketing small, round pizzas and presents tremendous marketability and consumer acceptance of pizza A.

To brown the lower surface 10 of pizza A, upper or top sheet 126 is provided with a standard microwave susceptor material in a circular pattern defined as area 130 on top sheet 126, as shown in FIG. 4 and in dotted lines in FIGS. 3 and 5. Diameter a of area 130 is selected to provide sufficient heating area to contact lower flat surface 10 of crust portion B of the pizza. Thus, the diameter of area 130 generally matches diameter d of lower surface 10. In practice, the area 130 of microwave susceptor material is substantially greater in size than the lower surface of the crust portion B to assure that the total crust portion rests upon and contacts area 130. If the pizza is somewhat misaligned or various sized pizzas are sold with the same platform 100, the total lower surface 10 of the pizza is in heat transfer contact with the microwave susceptor material of area 130. Of course, the total top sheet 126 could be formed with microwave susceptor material; however, this is not done in practice to reduce the cost of platform 100 and to provide an outer boundary of this platform which does not heat to a substantially elevated temperature.

Figure 6:
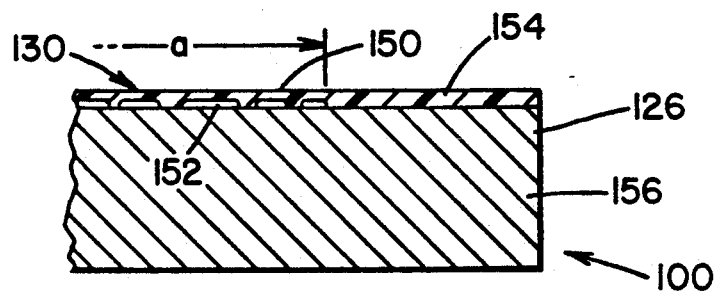
FIG. 6 is an enlarged cross-sectional view taken generally along lines 6—6 of FIG. 4.

Heating area 130 is formed from a standard susceptor material schematically illustrated in FIG. 6. Susceptor portion 150 in area 130 includes vapor deposited elemental aluminum 152 on the back surface of plastic film 154 which film is adhered to support paper board 156 in accordance with standard practice. Of course, any types of susceptor technology could be employed at area 130. FIG. 6 is only representative in nature to show the type of material normally anticipated in a microwave susceptor sheet. Film 154 is selected for heat resistivity so that it will not crack and will protect the food from the layer of deposited elemental aluminum 152. As microwave energy passes through the elemental aluminum layer 152 from either the top or bottom, eddy currents are created in the aluminum layer to create high temperatures. Thus, area 130 becomes extremely hot during exposure of susceptor material 150 to microwave energy. The amount of heat is controlled by the surface resistivity of layer 152, which resistivity is selected to produce a temperature in the general range of 400° F. This temperature will brown lower surface 10 of crust portion B by direct conduction heating of the crust surface as it is in contact with area 130. As the microwave energy passes through area 130, as shown in FIG. 2, the susceptor material reaches an elevated temperature. This causes conduction heating CD at the crust portion B. Thus, the crust is baked as well as browned and made crisp on the bottom surface. As so far described, only the bottom surface 10 of crust B is browned to the desired appearance. The microwave energy from the top will thaw and cook the pizza to obtain the desired texture. Energy from floor F also cooks the total pizza. The difficulty is that the visually exposed portion defined as band D at included angle b shown in FIGS. 7A-7D is not browned by the microwave. Thus, a microwave reconstituted frozen pizza as so far explained is not commercially acceptable from a marketing standpoint. The band D which is sufficiently cooked by conduction and microwave energy has the proper texture, but not the required browned tint, which tint is obtainable by reconstituting a frozen pizza in a standard convection oven, but not in a microwave oven. The present invention overcomes this difficulty by providing a browned crust in band D.

Figure 7A:
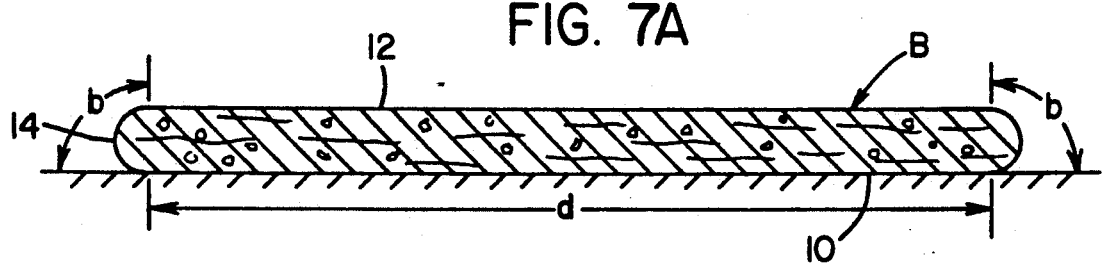
FIGS. 7A-7D are cross-sectional views of a pizza made in accordance with the present invention illustrating certain operations performed during the manufacturing process; and, FIG. 8 is a side elevational view of a frozen pizza constructed in accordance with the present invention.
Figure 7B:
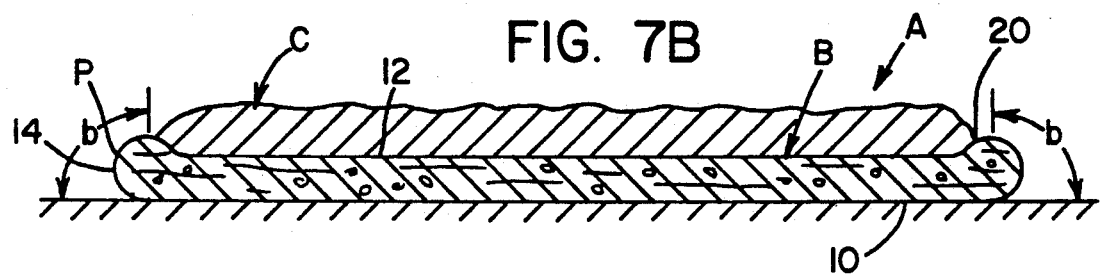
Figure 7C:
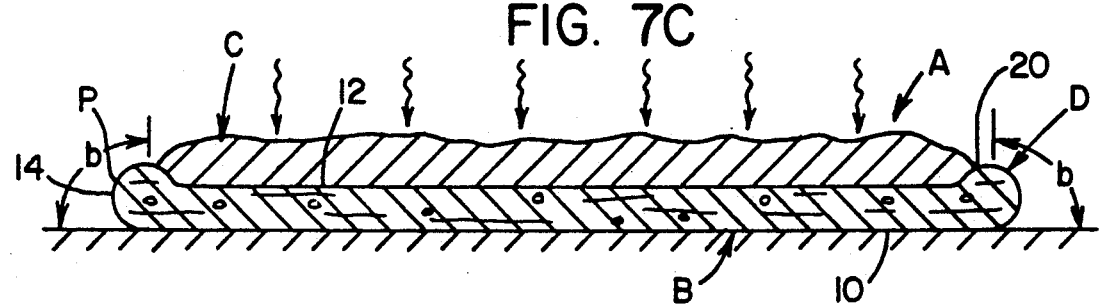
Figure 7D:
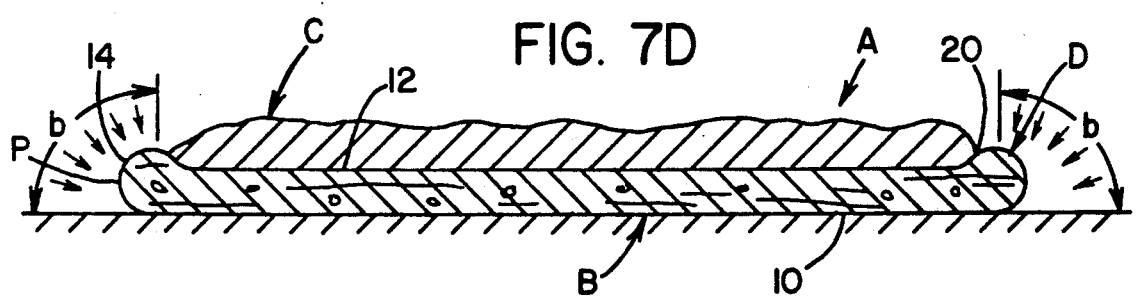
Figure 8:
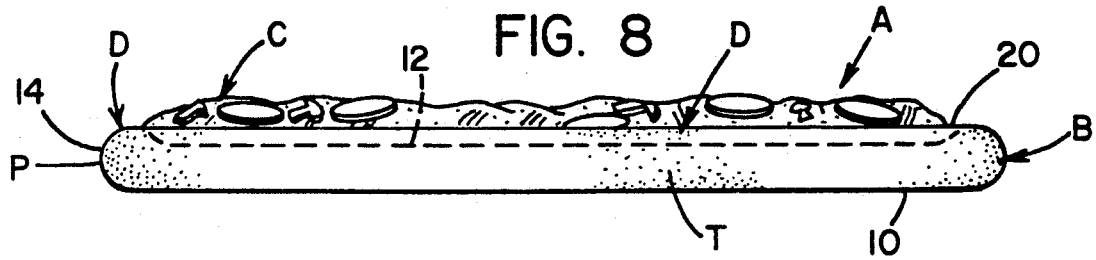

In accordance with the present invention, the pizza A as shown in FIG. 8 is manufactured generally as illustrated in FIGS. 7A-7D. First, dough is cut into a circular shape and rolled into a flat condition, as shown in FIG. 7A. The sequence of cutting and rolling is immaterial. After the dough is prepared for crust portion B, topping C is applied onto surface 12. There may be a slight indentation in the top of the pizza, as shown in FIG. 7B. The topping material C is sauce, cheese and other food items, which items may be frozen or precooked. After the pizza has been assembled as shown in FIG. 7B, it is heated in a standard convection oven as schematically illustrated in FIG. 7C. Thus, the pizza is precooked and ready for final baking. In accordance with the present invention, a liquid crust coloring substance is sprayed onto the crust band D, which is the visually exposed area of crust portion B between topping C and the lower flat surface 10. This coating can be applied before the heating process as shown in FIG. 7C. Thus, the crust coloring substance would be preheated and possibly darkened during the convection heating process for pizza A. Irrespective of the process employed, the crust coloring substance is applied to the peripheral band D for the purpose of imparting to this area a selected brown condition acceptable for the final reconstituted pizza. Thus, pizza A has a tint T around the visual exposed surface areas of crust portion B, as schematically illustrated in FIG. 8.

By using the liquid crust coloring substance, pizza A can then be frozen, shipped and stored for reconstitution by a microwave oven explained with respect to FIG. 2. This reconstituted pizza has an outer browned surface for the crust portion B, due to the presence of the liquid coloring substance. The liquid substance is applied to the pizza, in practice, preparatory to the heating operation set forth in FIG. 7C so that the liquid substance is evaporated to leave a deposited layer of a brown substance on crust B. This color of the brown substance can be controlled to provide a desired tint T acceptable to the marketing demands of a completely microwave reconstituted frozen pizza.

In practice, the liquid crust browning substance was initially formed from an emulsion including a caramelized browning agent. In accordance with an aspect of the invention, the presently employed liquid crust coloring substance is 5% instant coffee, 45% water and 50% liquid margarine. Another preferred embodiment for the liquid crust coloring substance is 5% instant tea (Nestea) 45% water and 50% liquid margarine. Application on an 8.0 inch pizza is approximately 1.0 grams per pizza. When this same substance is used on the upper surface of a meat pie, 0.40 grams of the liquid substance is employed. After application, the crust portion of the food item is heated to evaporate the water and deposit the coloring substance onto the exposed crust portion. The convection heating during manufacturing of the frozen product, shown in FIG. 7C, can change the brown tint T or the substance itself can have the desired color.

As a broader aspect of the invention, the liquid crust coloring substance includes as the coloring agent coffee, coffee extracts, spray dried coffee, freeze dried coffee, chicory, chicory extract, spray dried chicory, freeze dried chicory, tea, tea extracts, spray dried tea, and freeze dried tea. These substances can be regular or decaffeinated and are dispersed within an aqueous solution by margarine, milk, milk products, egg whites, and/or egg white powders. By using these dispersing agents, a product, such as a pizza shell, or pie crust will allow the microwave cooked shell or crust to look brown rather than pale; therefore, the appearance of the resulting microwave constituted crust portion will have the appearance of a convection cooked or baked product.

Of course, this browning agent or liquid crust coloring substance could be used to enhance the brown appearance of a conventional oven baked or cooked product. The degree of induced browning or brown appearance can be adjusted by the dosage of the browning agent, the cooking time, and the cooking temperature chosen. Thus, as the product is cooked preparatory to freezing as indicated in FIG. 7C, the desired tint T is imparted to the exposed area of crust portion B.

In practice, pizza A can be totalled reconstituted in a microwave. In an oven having a rating of 600–700 watts, the microwave oven should be set at full power for 2.0 minutes. Then the pizza should be rotated on the microwave crisper or platform 180°. Then the microwave oven should continue to heat pizza A for 2–3 minutes at full power. Thus, in a microwave oven rated at 600–700 watts the pizza is cooked in 4–5 minutes. If a lower power unit is employed, such as 400–500 watts, the pizza should be heated at full power for 3.0 minutes. Thereafter, the pizza should be rotated on the crisper 180° and heated additional 3–4 minutes at full power. Thus, the pizza is heated in 6–7 minutes with a low power microwave oven.

In practice, crust portion B is precooked or baked in the round form. Then topping C is added and the crust coloring substance or browning agent is sprayed onto the marginal band D. There is no heating of the pizza as shown in FIG. 7D. The pizza is immediately frozen for shipment. It is more economical to spray or coat the top surface 12 with the liquid crust coloring substance before adding the topping C, indeed, the whole surface 12 can be coated. The preferred embodiment coats only the exposed band D because it is a savings of the coloring substance or browning agent, which savings is more than the decrease in processing cost by coating the whole or most of surface 12. Consequently, when the invention is defined as coating the visually exposed area of crust portion B, it can be done by coating the surface 12 and then defining band B by depositing topping C. Further, the pizza may be shipped, stored and sold only in a refrigerated state without departing from the invention.

Having thus defined the invention, the following is claimed:

1. A method of making a microwave reconstituted pizza having a preselected outer periphery, a lower crust with a generally flat bottom surface, an upper generally flat surface parallel to said lower surface and a generally curved marginal portion around said periphery and joining said parallel surfaces of said crust, said method comprising the steps of:
    a) depositing food topping onto said upper surface in a selected area having an outermost border generally matching said periphery and exposing an outer crust band above said bottom surface and including said marginal portion of said crust; and,
    b) applying a coating of a crust coloring substance upon said outer crust band, said crust coloring substance consisting of an aqueous solution of an edible dispersing agent and a naturally occurring coloring agent.

2. The method as defined in claim 1, wherein said coloring agent is selected from the group consisting of chicory, coffee, tea and mixtures thereof.

3. The method as defined in claim 1, wherein said edible dispersing agent is selected from the group consisting of margarine, milk, milk powder, egg whites, egg white powder and mixtures thereof.

4. The method as defined in claim 1, including the additional step of at least partially baking said pizza whereby said substance is evaporated and converted to the desired brown tint.

5. The method as defined in claim 1, including the additional step of freezing said reconstitutionable pizza for storage and/or shipment.

6. The method as defined in claim 1, wherein said coloring agent is about 3 to 10 weight percent of said coating.

7. The method as defined in claim 2, wherein said coloring agent is about 3 to 10 weight percent of said coating.

8. The method as defined in claim 7, wherein said coloring agent is coffee.

9. The method as defined in claim 7, wherein said coloring agent is tea.

10. The method as defined in claim 1, wherein said pizza is heated in about 6–7 minutes in a microwave oven having a rating of 400–500 watts.

11. The method as defined in claim 1, wherein said pizza is heated in about 4–5 minutes in a microwave oven having a rating of 600–700 watts.

12. A coating applied to a pizza dough crust whereby said coating forms a brown tint on said crust, said coating comprises an edible dispersing agent and a naturally occurring coloring agent, said coloring agent being about 3–10 weight percent of said coating.

13. A coating as defined in claim 12, wherein said edible dispersing agent is selected from the group consisting of margarine, milk, milk powder, egg whites, egg white powder and mixtures thereof.

14. A coating as defined in claim 12, wherein said coloring agent is selected from the group consisting of chicory, coffee, tea and mixtures thereof.

15. A coating as defined in claim 13, wherein said coloring agent is selected from the group consisting of chicory, coffee, tea and mixtures thereof.

16. A coating as defined in claim 15, wherein said coating consists of a coloring agent and an edible dispersing agent.

* * * * *